United States Patent
Takemura

(10) Patent No.: US 7,908,058 B2
(45) Date of Patent: Mar. 15, 2011

(54) VEHICLE SEAT BELT CONTROLLER

(75) Inventor: Noriaki Takemura, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1099 days.

(21) Appl. No.: 11/652,152

(22) Filed: Jan. 11, 2007

(65) Prior Publication Data

US 2007/0198154 A1    Aug. 23, 2007

(30) Foreign Application Priority Data

Jan. 12, 2006   (JP) .................................. 2006-005106
Jan. 10, 2007   (JP) .................................. 2007-002207

(51) Int. Cl.
    *B60R 22/00*   (2006.01)
(52) U.S. Cl. .......................................... 701/45; 280/734
(58) Field of Classification Search ............. 701/45–47; 280/734, 735; 180/268, 271, 274
    See application file for complete search history.

(56) References Cited

U.S. PATENT DOCUMENTS

| 4,487,381 | A | * | 12/1984 | Kubota | ...................... 242/375.3 |
| 7,020,552 | B2 | * | 3/2006 | Park | ................................ 701/45 |
| 2003/0114973 | A1 | | 6/2003 | Takagi et al. | |

FOREIGN PATENT DOCUMENTS

JP         3575475         7/2004

* cited by examiner

*Primary Examiner* — Dalena Tran
(74) *Attorney, Agent, or Firm* — Drinker Biddle & Reath LLP

(57) ABSTRACT

A tensioner and a method of controlling tension for a three-point seat belt installed in a vehicle include an adjuster that varies tension of the three-point seat belt, a detector that signals a direction of a turn made by the vehicle, and a controller that is coupled to the adjuster and to the detector. The three-point seat belt is used to restrain both sides of an occupant's lumbar region as well as one of the occupant's right and left shoulders. The controller controls the adjuster so that the tension of the three-point seat belt when the direction of the turn is opposite to the one of the occupant's right and left shoulders that is restrained by the three-point seat belt is set lower than when the direction of the turn corresponds to the one of the occupant's right and left shoulders that is restrained by the three-point seat belt.

18 Claims, 3 Drawing Sheets

VEHICLE SEAT BELT CONTROLLER

CROSS-REFERENCE TO RELATED APPLICATIONS

This application claims priority under 35 U.S.C. §119 to Japanese Patent Application No. 2006-005106, filed on Jan. 12, 2006, and to Japanese Patent Application No. 2007-002207, filed on Jan. 10, 2007, the disclosures of which are incorporated by reference herein in their entirety.

BACKGROUND OF THE INVENTION

1. Field of the Invention

The invention pertains to a vehicle seat belt controller for controlling the tension of a three-point seat belt installed in a vehicle, e.g., a driver's seat of the vehicle.

2. Description of Related Art

Seat belt units and airbag units are conventionally installed in a vehicle, such as an automobile, for the purpose of restraining the occupants in the event of a collision. Of these two units, the seat belt unit is also used to restrain the occupants during normal travel, i.e., other than during a collision. Thus, it is desirable to create a proper sense of restraint for the occupants according to the given travel conditions of the vehicle.

Related vehicle seat belts adopt a so-called three-point seat belt unit with a structure to restrain seated occupants at three points, that is, at the lumbar region and at either the right or the left shoulder. More specifically, a right shoulder-restraining seat belt includes a structure that restrains the lumbar region and the right shoulder, and is generally used for those seats provided on the right-hand side of the vehicle. Conversely, a left shoulder-restraining seat belt includes a structure that restrains the lumbar region and the left shoulder, and is generally used for those seats provided on the left-hand side of the vehicle.

When related right and left shoulder-restraining seat belts are both controlled in unison in response to a lateral load that acts on the occupants, e.g., when the vehicle makes a turn, there is the risk that the conventional shoulder-restraining seat belt may inappropriately fit the occupant. That is, if both the right and left shoulder-restraining seat belts are controlled uniformly, e.g., the same seat belt timing take-up is used, then an occupant might experience discomfort due to the related shoulder-restraining seat belt.

For example, as a vehicle makes a right turn, a leftward centrifugal force acts on the occupants, and the bodies of the occupants tend to move toward the left. For those occupants seated in seats equipped with conventional right shoulder-restraining seat belts, an appropriate restraining effect may be achieved. However, for those occupants seated in the seats equipped with left shoulder-restraining seat belts, the same seat belt take-up operation as applied to the right shoulder-restraining seat belts is potentially undesirable in that the left shoulder-restraining seat belts may shift from the left shoulder to the neck of an occupant, thereby potentially causing the occupant to experience discomfort.

BRIEF SUMMARY OF THE INVENTION

Preferably, a seat belt unit is provided that is capable of independently controlling the tensions of the seat belts provided for the driver's seat and the seats of the other occupants. The tensions to be applied to the seat belts for the seats of the occupants other than the driver are controlled to be greater than the tension applied to the seat belt for the driver's seat. In addition, when the vehicle makes a turn, the tension applied to the seat belt for the driver's seat is controlled to be greater than the tensions applied to the seat belts for the seats of the other passengers.

Moreover, a seat belt unit preferably provides quicker take-up of the seat belts for the passengers' seats than that of the seat belt for the driver's seat during braking of the vehicle, and the seat belt for the driver's seat is taken up more quickly than the seat belts for the passengers' seats when the vehicle makes a turn.

Preferably, a seat belt unit provides a control mode to control only the seats on the right-hand side or on the left-hand side of the vehicle according to the given turning direction of the vehicle, and controls differently the tensions or the take-up timing of the seat belts in response to making a turn or during braking.

Accordingly, when occupants of a vehicle are subjected to a turning load that acts in an opposite direction to a turning direction of the vehicle, it is preferable that a vehicle seat belt controller reduces the discomfort experienced by an occupant due to the type of seat belt, i.e., either a right shoulder-restraining seat belt or a left shoulder-restraining seat belt, that is installed at the seat in which the occupant is seated.

In accordance with an embodiment of the invention, a vehicle seat belt tensioner for a three-point seat belt that is installed in a vehicle, and that is used to restrain both sides of an occupant's lumbar region as well as one of the occupant's right and left shoulders, includes an adjuster that varies tension of the three-point seat belt, a detector that signals a direction of a turn made by the vehicle, and a controller that is coupled to the adjuster and to the detector. The controller controls the adjuster so that the tension of the three-point seat belt when the direction of the turn is opposite to the one of the occupant's right and left shoulders that is restrained by the three-point seat belt is set lower than when the direction of the turn corresponds to the one of the occupant's right and left shoulders that is restrained by the three-point seat belt.

Also, in accordance with an embodiment of the invention, an occupant restraining system for a vehicle includes a seat belt that is disposed on the vehicle between a plurality of mounting points, an adjuster that is coupled to the seat belt and defines an occupant restraining condition, and a controller that outputs to the adjuster a control signal to redefine the occupant restraining condition in response to the vehicle making a turn. The plurality of mounting points includes first and second mounting points that are disposed at either side of a lumbar region of the occupant, and includes a third mounting point that is disposed at one of a right shoulder and a left shoulder of the occupant. The occupant restraining condition includes at least one of a take-up tension of the seat belt and a take-up time of the seat belt. The adjuster in response to the control signal reduces the take-up tension and increases the take-up time when the third mounting point is disposed at the one of the right and left shoulders that is opposite to the vehicle turning direction.

Further, in accordance with an embodiment of the invention, an occupant restraining system for a vehicle that includes first and second seats includes a first seat belt that is disposed on the vehicle between a first plurality of mounting points, a first adjuster that is coupled to the first seat belt and defines a first occupant restraining condition, a second seat belt that is disposed on the vehicle between a second plurality of mounting points, a second adjuster that is coupled to the second seat belt and defines a second occupant restraining condition, and a controller that outputs first and second control signals to the first and second adjusters, respectively, to redefine the first and second occupant restraining conditions relative to one another in response to the vehicle making a turn. The first plurality of mounting points includes first lumbar region mounting points that are disposed at either side of the first seat, and includes a left shoulder mounting point that is disposed at a left side of the first seat. The first occupant restraining condition includes at least one of a first take-up tension of the first seat belt and a first take-up time of the first seat belt. The second plurality of mounting points includes second lumbar region mounting points that are disposed at either side of the second seat, and includes a right shoulder mounting point that is disposed at a right side of the second seat. The second occupant restraining condition includes at least one of a second take-up tension of the second seat belt and a second take-up time of the second seat belt.

Further, in accordance with an embodiment of the invention, a vehicle seat belt tensioner for a three-point seat belt that is installed in a vehicle, and is used to restrain both sides of an occupant's lumbar region as well as one of the occupant's right and left shoulders, includes tension means for adjusting tension of the three-point seat belt, turning means for detecting a turn made by the vehicle, and control means for controlling the tension means in response to the turning means detecting that the vehicle has made the turn such that the tension of the three-point seat belt when a direction of the turn is opposite to the one of the occupant's right and left shoulders that is restrained by the three-point seat belt is set lower than when the direction of the turn corresponds to the one of the occupant's right and left shoulders that is restrained by the three-point seat belt.

Further, in accordance with an embodiment of the invention, a method of controlling tension of a three-point seat belt that is installed in a vehicle, and that restrains both sides of an occupant's lumbar region as well as one of the occupant's right and left shoulders, includes detecting that the vehicle is making a turn in one of a right direction and a left direction, and controlling the tension of the three-point seat belt in response to the detecting such that the tension of the three-point seat belt when the turn in the one of the right and left directions is opposite to the one of the occupant's right and left shoulders being restrained by the three-point seat belt is set lower than when the turn in the one of the right and left directions corresponds to the one of the occupant's right and left shoulders being restrained by the three-point seat belt.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 2b is a schematic diagram illustrating control of a right shoulder-restraining seat belt and a left shoulder-restraining seat belt when the vehicle is making the left turn shown in FIG. 2a.

DETAILED DESCRIPTION OF THE PREFERRED EMBODIMENTS

Figure 1:
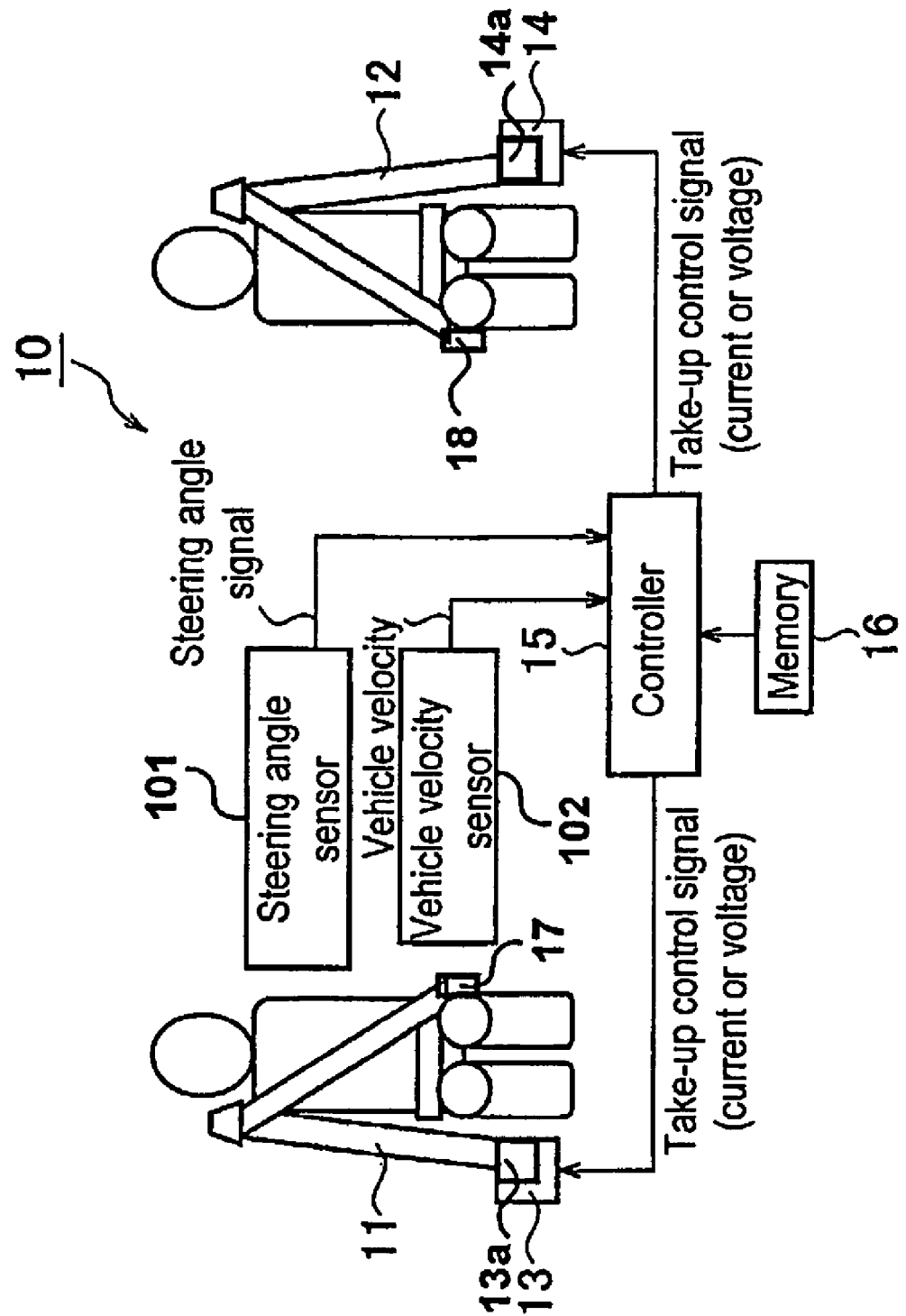
FIG. 1 is a diagram showing an outline of a seat belt unit according to an embodiment of the present invention.

A seat belt unit 10 shown in FIG. 1 may be installed in a vehicle, such as an automobile. The type of vehicle in which the seat belt unit 10 is installed is arbitrary, as the seat belt unit 10 can, generally, be installed in a wide variety of vehicles.

The explanation hereinafter assumes a vehicle with right-hand steering, i.e., in which the driver's seat is provided on the right-hand side of the vehicle. As shown in FIG. 1, which shows a seating configuration when the vehicle is viewed from the front, the driver's seat appears on the left-hand side in the figure. However, the seat belt unit 10, as well as the features and advantages thereof, are equally applicable to a vehicle with left-hand steering, i.e., in which the driver's seat is provided on the left-hand side of a vehicle.

Seat belt unit 10 is equipped with seat belts 11 and 12 that are installed at the driver's and passenger's seats, respectively. Motors 13 and 14 are used to take up respective seat belts 11 and 12 in order to adjust the tensions of the seat belts. A controller 15 is electrically coupled with the driving of motors 13 and 14, and a memory 16 stores restraining structure information, e.g., which type of belt is installed at the driver's seat, which type of belt is installed at the passenger's seat, etc. Buckles 17 and 18 are used to engage/disengage the ends of seat belts 11 and 12, respectively. In addition, motors 13 and 14 are equipped with locks 13a and 14a that restrain the take-up of seat belts 11 and 12.

As they are used herein, the terms "take-up" and "release" refer to adjusting the length of a seat belt strap, and preferably refer to shortening and lengthening, respectively, the seat belt.

Seat belts 11 and 12 are preferably three-point seat belts that restrain a seated occupant at three points, that is, at two points across the lumbar region and at a third point across one shoulder. As shown in FIG. 1, seat belt 11 is installed at the driver's seat and is a right shoulder-restraining seat belt, i.e., that restrains the driver's lumbar region and right shoulder. And seat belt 12 is installed at the passenger's seat and is a left shoulder-restraining seat belt, i.e., that restrains the passenger's lumbar region and left shoulder.

Rotary shafts of motors 13 and 14 are connected to respective seat belts 11 and 12 and turn based on control signals output from controller 15 in order to take up or release respective seat belts 11 and 12.

The control signals to motors 13 and 14 may have any suitable form. For example, a control signal may vary current magnitude supplied to control motors 13 and 14, or may vary voltage magnitude supplied to control motors 13 and 14. The power for driving motors 13 and 14 may be output directly from controller 15, or a power amplifier (not shown) may electrically couple controller 15 to control motors 13 and 14.

Locks 13a and 14a preferably engage the respective rotary shafts of motors 13 and 14 based on control signals output from controller 15. When locks 13a and 14a are engaged, rotation of the rotary shafts of motors 13 and 14 can be locked to prevent or restrain the rotary shafts from turning in the take-up direction and thereby prevent respective seat belts 11 and 12 from moving in the take-up direction.

The control signals to locks 13a and 14a may have any suitable form. For example, a control signal may vary current magnitude supplied to locks 13a and 14a, or may vary voltage magnitude supplied to locks 13a and 14a. The power for driving locks 13a and 14a maybe output directly from controller 15, or a power amplifier (not shown) may electrically couple controller 15 to locks 13a and 14a.

Alternatively, motors 13 and 14 may be configured such that they provide the functions otherwise provided by locks 13a and 14a. That is, motors 13 and 14, per se, in response to control signals from controller 15 may prevent or restrain the rotary shafts of motors 13 and 14 from turning in the take-up direction and thereby prevent respective seat belts 11 and 12 from moving in the take-up direction.

A steering angle sensor 101 detects vehicle steering angle and outputs to controller 15 a corresponding vehicle steering angle signal and a velocity sensor 102 detects vehicle velocity and outputs to controller 15 a corresponding vehicle velocity signal. The respective signals from steering angle sensor 101 and from velocity sensor 102 provide a turning direction detection means for indicating whether and in which direction the vehicle is making a turn. In response to a vehicle turn being detected, controller 15 outputs separate control signals to motors 13 and 14 on the basis of the restraining structure information stored in memory 16 so as to control the take-up operations for seat belts 11 and 12. Accordingly, the tensions of seat belts 11 and 12 can be independently controlled, and restraining forces in accordance with the restraining structures can be applied to the occupants.

As used herein, the term "tension" refers to the tensile load carried by a seat belt. In addition, the term "restraining force," as used herein, refers to the force that the seat belt applies to an occupant in the course of restraining movement with respect to the seat.

Memory 16 is equipped with a nonvolatile semiconductor memory in which restraining structure information is pre-stored. The restraining structure information preferably includes information that indicates which shoulder, that is, the right or the left, is primarily restrained by the respective seat belts 11 and 12 installed at the driver's seat and at the passenger's seat. That is, the restraining structure information preferably indicates to controller 15 whether a seat belt is a right shoulder-restraining seat belt or a left shoulder-restraining seat belt.

Figure 2B:
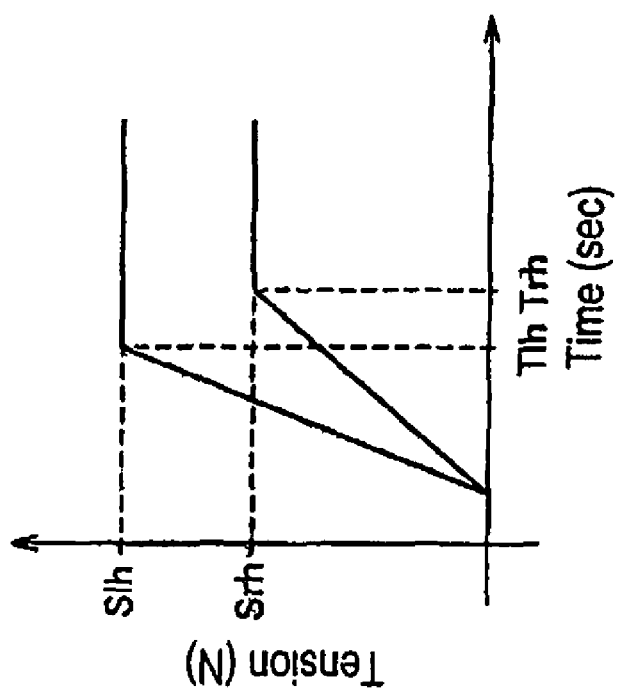
Figure 2A:
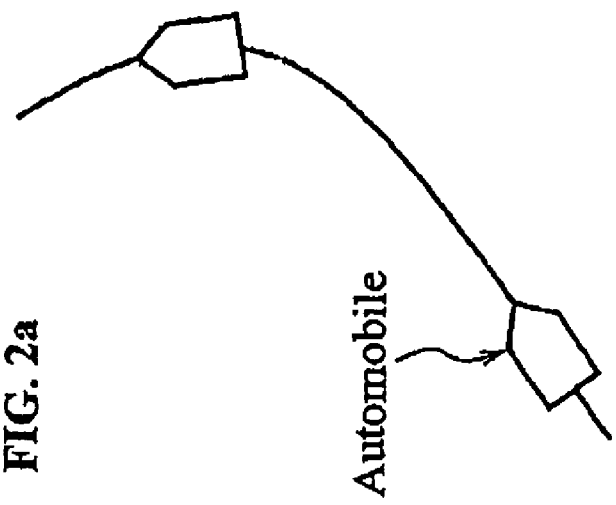
FIG. 2a is a schematic diagram showing a vehicle making a left turn.

With reference to FIGS. 2a and 2b, when the steering angle signal and the vehicle velocity signal indicate that the vehicle is turning to the left, as shown in FIG. 2a, controller 15 outputs control signals to motors 13 and 14 such that take-up tension Slh created by motor 14 for left shoulder-restraining seat belt 12 is greater than take-up tension Srh created by motor 13 for right shoulder-restraining seat belt 11, as shown in FIG. 2b. Furthermore, as shown in FIG. 2b, while the vehicle is turning, controller 15 controls the taking-up of the seat belts in such a way that take-up time Tlh for left shoulder-restraining seat belt 12 will be shorter than take-up time Trh for right shoulder-restraining seat belt 11.

On the other hand, when the steering angle signal and the vehicle velocity signal indicate that the vehicle is turning to the right, controller 15 outputs control signals to motors 13 and 14 such that take-up tension Srh created by motor 13 for right shoulder-restraining seat belt 11 is greater than take-up tension Slh created by motor 14 for left shoulder-restraining seat belt 12. Furthermore, while the vehicle is turning, controller 15 controls the taking-up of the seat belts in such a way that take-up time Trh for right shoulder-restraining seat belt 11 will be shorter than take-up time Tlh for left shoulder-restraining seat belt 12.

Next, an example of the control process performed by seat belt unit 10 with the aforementioned configuration will be explained with reference to the flow chart shown in FIG. 3.

In the case of seat belt unit 10, at prescribed intervals while the vehicle is traveling, controller 15 first determines, on the basis of the steering angle signal and the vehicle velocity signal, whether the vehicle is making a turn in order to determine whether to initiate control of the seat belt take-up operations (Step S1). If control of the take-up operations is to be initiated as a result of determining that a turn is being made, process control advances to Step S2; otherwise, the take-up operation control is not initiated, and process control ends.

In Step S2, based on the steering angle signal and the vehicle velocity signal, controller 15 determines whether the vehicle is making a right turn. If controller 15 determines that the vehicle is turning right, process control advances to Step S4. Otherwise, if the vehicle is not turning right, process control advances to Step S3.

In Step S4, controller 15 sets target take-up tension Srh of right shoulder-restraining seat belt 11, and sets target arrival time Trh, i.e., the time it takes to reach the target tension of right shoulder-restraining seat belt 11, based on the steering angle signal and the vehicle velocity signal. For example, controller 15 may set target take-up tension Srh to approximately 60 Newtons (N), and set target arrival time Trh to approximately 300 milliseconds (msec). Next, in Step S5, controller 15 sets target take-up tension Slh and target arrival time Tlh of left shoulder-restraining seat belt 12, also based on the steering angle signal and the vehicle velocity signal. For example, controller 15 may set target take-up tension Slh to approximately 40 N, and set target arrival time Tlh to approximately 700 msec.

On the other hand, in Step S3, based on the steering angle signal and the vehicle velocity signal, controller 15 determines whether the vehicle is making a left turn. If controller 15 determines that the vehicle is turning left, process control advances to Step S6. Otherwise, if the vehicle is not turning left, process control advances to Step S8.

In Step S6, controller 15 sets target take-up tension Slh of left shoulder-restraining seat belt 12, and sets target arrival time Tlh, i.e., the time it takes to reach the target tension of left shoulder-restraining seat belt 12, based on the steering angle signal and the vehicle velocity signal. For example, controller 15 may set target take-up tension Slh to approximately 60 N, and set target arrival time Tlh to approximately 300 msec. Next, in Step S7, controller 15 sets target take-up tension Srh and target arrival time Trh of right shoulder-restraining seat belt 11, also based on the steering angle signal and the vehicle velocity signal. For example, controller 15 may set target take-up tension Srh to approximately 40 N, and set target arrival time Trh to approximately 700 msec.

If in Step S3 controller 15 determines that the vehicle is not turning to the left, that is, the vehicle is turning neither right nor left, then controller 15 determines that some type of system failure has occurred, and both right shoulder-restraining seat belt 11 and left shoulder-restraining seat belt 12 are controlled based on preset initial values, e.g., stored in memory 16. For example, in Step S8, controller 15 may set target take-up tension Slh of left shoulder-restraining seat belt 12 to approximately 50 N and may set target arrival time Tlh to approximately 500 msec and, in Step S9, controller 15 may similarly set target take-up tension Srh of right shoulder-restraining seat belt 11 to 50 N and may similarly set target arrival time Trh to 500 msec.

After finishing any of the aforementioned Step S5, Step S7, and Step S9, controller 15 outputs in Step 10 control signals to motors 13 and 14 to control motors 13 and 14 in such a way that the target take-up tensions are reached by the target arrival times set during the aforementioned processing and starts the take-up control of seat belts 11 and 12 installed in the respective seats.

Next, in Step S11, controller 15 determines, based on the steering angle signal and the vehicle velocity signal, whether the conditions for canceling the take-up of the seat belts have been met. If controller 15 determines that the take-up cancellation conditions are not met, Step S11 is repeated until controller 15 determines that the take-up cancellation conditions are met, and process control then advances to Step S12. For example, preset specific conditions for take-up cancellation may include the vehicle returning to straight-line travel, or the vehicle traveling at or below a prescribed vehicle velocity.

In Step S12, controller 15 outputs control signals for canceling the seat belt take-up operations to motors 13 and 14 before ending the process.

As explained above, in the case of seat belt control 10, the restraining structure information that indicates whether the right or the left shoulder is primarily restrained by the structures of seat belt 11 or 12 installed at the seats of the vehicle (i.e., which is the right shoulder-restraining seat belt and which is the left shoulder-restraining seat belt) is stored in memory 16. Further, motors 13 and 14, which carry out the take-up and release operations of seat belts 11 and 12, are controlled on the basis of the restraining structure information when the vehicle is making a turn in order to control independently the operations of right shoulder-restraining seat belt 11, which in the exemplary embodiment primarily restrains the right shoulder, and left shoulder-restraining seat belt 12, which in the exemplary embodiment primarily restrains the left shoulder. The controller controls the adjuster so that the tension of the seat belt when the vehicle is traveling straight is set lower than when the vehicle is turning.

Accordingly, embodiments of the present invention provide a number of features and advantages, at least some of which are described below.

When the vehicle is making a turn, the turning load acts on the occupants of the respective seats in the direction opposite the turning direction. However, discomfort experienced by the occupants due to the seat belt type that is installed at the occupant's seat (i.e., a seat with either a right shoulder-restraining seat belt or a left shoulder-restraining seat belt) can be reduced by executing the appropriate take-up control for right shoulder-restraining seat belt 11 and for left shoulder-restraining seat belt 12.

When the vehicle is making a turn, the tension of the seat belt that is restraining the shoulder opposite to the turning direction is set lower than the tension of the seat belt restraining the shoulder that is in the turning direction. Thus, an occupant wearing a seat belt that is restraining the shoulder opposite to the turning direction will sense sufficiently firm restraint while any discomfort that may occur due to the seat belt coming in contact with the occupant's neck can be reduced.

The controller controls the adjuster so that the tension of the seat belt (both of the seat belt that is restraining the shoulder correspond to and opposite to the turning direction) when the vehicle is traveling straight is set lower than when the vehicle is turning. Thus, appropriate vigor can be given the occupants in that a body of the occupants can be stabilized when the vehicle going straight on than the vehicle turning which load of the crosswise direction hangs to the occupants.

The controller controls the seat belts by computing the target take-up tensions of the seat belts based on the steering angle and vehicle velocity signals. Thus, the seat belts can be taken up using take-up tensions appropriate for a given steering angle and vehicle velocity.

The controller computes the seat belt take-up times based on the steering angle and vehicle velocity signals such that the operating time of the motor for the seat belt that is restraining the shoulder opposite to the turning direction is set lower than the operating time of the seat belt restraining the shoulder that is in the turning direction. Thus, there may be a reduction in discomfort that may occur due to the seat belt coming in contact with the neck of an occupant wearing a seat belt that is restraining the shoulder opposite to the turning direction.

The controller controls the seat belts by computing the take-up times in such a way that the take-up times for each of the seat belts end at different times, thereby providing the occupant's a more comfortable sense of restraint as the vehicle travels around sharp curves.

Figure 3:
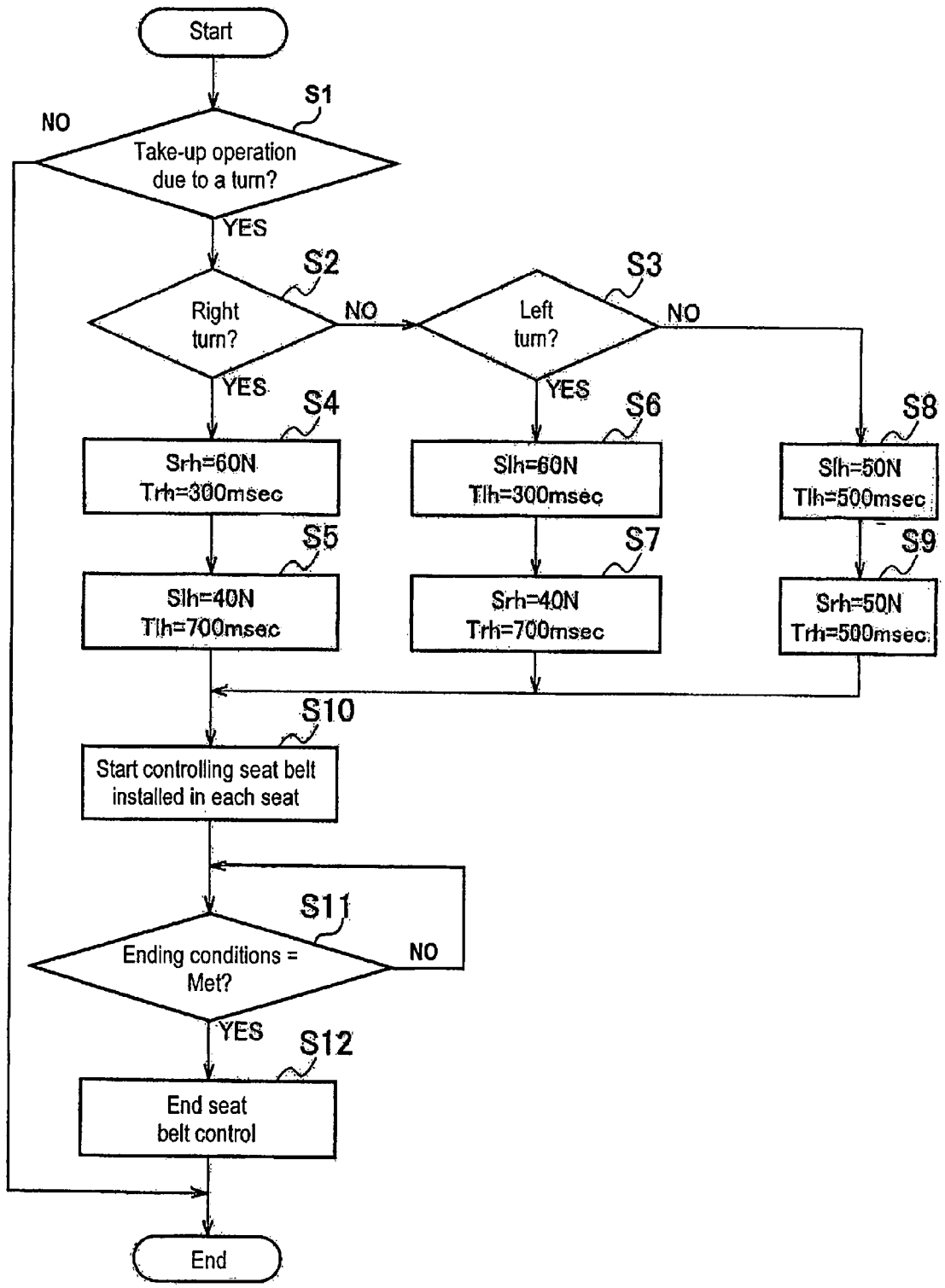
FIG. 3 is a flow chart showing an example of control processing carried out by the seat belt unit.

Although the example described with respect to FIGS. 1-3 discusses changing both the take-up tensions and the take-up times, it is also possible to independently control in the aforementioned manner only the take-up tensions or the take-up times.

For example, the take-up tensions may be fixed and only the seat belt take-up times computed and controlled by the controller on the basis of the steering angle and vehicle velocity signals. That is to say, in this case computing and controlling the take-up tensions is no longer necessary, and the controller would set only the relative operating times such that the operating time of the motor for the seat belt that is restraining the shoulder opposite to the turning direction is greater than the operating time of the motor for the seat belt restraining the shoulder that is in the turning direction.

Alternatively, the take-up times may be fixed and the seat belt take-up tensions computed on the basis of the steering angle and vehicle velocity signals. In this case, computing and controlling the take-up times is no longer necessary, and the controller would set only the relative take-up tensions such that the take-up tension of the motor for the seat belt that is restraining the shoulder opposite to the turning direction is less than the take-up tension of the motor for the seat belt restraining the shoulder that is in the turning direction.

The example described with respect to FIGS. 1-3 discusses the memory and the controller being separately disposed such that only one controller configuration is necessary, even for different vehicles with seat belts having reversed shoulder-restraining sides. It is also envisioned that the restraining structure information may be stored in various types of memory that are internal to the controller.

It is also envisioned that a specific configuration of controller may be provided for all of the seat belts in a vehicle that are for the same shoulder-restraining side, i.e., left shoulder-restraining or right shoulder-restraining. Thus, the seat belts connected to the same controller would all have the same shoulder restraint information, and it would not be necessary to provide a memory for storing relative restraining structure information.

The steering angle sensor and the vehicle velocity sensor are used to detect the turning direction. Thus, the seat belt take-up tensions can be controlled on the basis of accurate steering angle and vehicle velocity information.

The motors that take-up and release the seat belts are used to adjust the relative tensions of the seat belts. These same motors may also be used to pretension the seat belts. As used herein, the term "pretension" refers to preemptively tightening a seat belt, e.g., in the event of an impending collision, that may be based on detecting a sudden deceleration or on detecting lateral acceleration.

The locks that prevent the seat belts from moving in the take-up direction are used to limit the tension of the seat belts. Thus, when the seat belts are to be loosened, controlling the locks facilitates achieving an optimum sense of the restraint that is provided by the seat belts.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A vehicle seat belt tensioner for a three-point seat belt installed in a vehicle and used to restrain both sides of an occupant's lumbar region as well as one of the occupant's right and left shoulders, the vehicle seat belt tensioner comprising:
   an adjuster varying tension of the three-point seat belt;
   a detector signaling a direction of a turn made by the vehicle; and
   a controller being coupled to the adjuster and to the detector, the controller controlling the adjuster so that the tension of the three-point seat belt when the direction of the turn is opposite to the one of the occupant's right and left shoulders being restrained by the three-point seat belt is set lower than when the direction of the turn corresponds to the one of the occupant's right and left shoulders being restrained by the three-point seat belt,
   wherein the adjuster varies the tension within an operating time, and the controller controls the adjuster so that the operating time when the direction of the turn corresponds to the one of the occupant's right and left shoulders being restrained by the three-point seat belt is set shorter than when the direction of the turn is opposite to the one of the occupant's right and left shoulders being restrained by the three-point seat belt.

2. The vehicle seat belt tensioner described in claim 1, wherein the controller controls the adjuster so that the tension of the three-point seat belt when the vehicle is traveling straight is set lower than when the direction of the turn is opposite to the one of the occupant's right and left shoulders being restrained by the three-point seat belt.

3. The vehicle seat belt tensioner described in claim 1, wherein the controller controls the adjuster so that the tension of the three-point seat belt when the direction of the turn corresponds to the one of the occupant's right and left shoulders being restrained by the three-point seat belt is set higher than when the vehicle is traveling straight.

4. The vehicle seat belt tensioner described in claim 1, wherein the controller computes a target tension for the three-point seat belt and controls the adjuster so that the tension of the three-point seat belt approaches the target tension.

5. The vehicle seat belt tensioner described in claim 1, further comprising:
   a memory storing restraining structure information, the restraining structure information including which of the occupant's right and left shoulders is restrained by the three-point seat belt; and
   the controller being coupled to the memory and controlling the adjuster based on the restraining structure information when the vehicle makes the turn.

6. The vehicle seat belt tensioner described in claim 1, wherein the detector comprises a vehicle velocity sensor and a steering angle sensor detecting a steering angle of the vehicle when the vehicle makes the turn.

7. The vehicle seat belt tensioner described in claim 1, wherein the adjuster carries out an operation for taking up and releasing the three-point seat belt.

8. The vehicle seat belt tensioner described in claim 1, wherein the adjuster comprises a lock restraining movement of the three-point seat belt in a take-up direction.

9. An occupant restraining system for a vehicle, the occupant restraining system comprising:
   a seat belt being disposed on the vehicle between a plurality of mounting points including:
      first and second mounting points disposed at either side of a lumbar region of the occupant; and
      a third mounting point disposed at one of a right shoulder and a left shoulder of the occupant;
   an adjuster being coupled to the seat belt and defining an occupant restraining condition, the occupant restraining condition including at least one of:
      a take-up tension of the seat belt; and
      a take-up time of the seat belt; and
   a controller outputting to the adjuster a control signal to redefine the occupant restraining condition in response to the vehicle making a turn;
   wherein the adjuster in response to the control signal reduces the take-up tension and increases the take-up time when the third mounting point is disposed at the one of the right and left shoulders opposite to the vehicle turning direction, and
   wherein the adjuster varies the take-up tension within an operating time, and the controller controls the adjuster so that the operating time when the direction of the turn corresponds to the one of the occupant's right and left shoulders being restrained by the three-point seat belt is set shorter than when the direction of the turn is opposite to the one of the occupant's right and left shoulders being restrained by the three-point seat belt.

10. An occupant restraining system for a vehicle including first and second seats, the occupant restraining system comprising:
   a first seat belt being disposed on the vehicle between a first plurality of mounting points including:
      first lumbar region mounting points disposed at either side of the first seat; and
      a left shoulder mounting point disposed at a left side of the first seat;
   a first adjuster being coupled to the first seat belt and defining a first occupant restraining condition, the first occupant restraining condition including at least one of:
      a first take-up tension of the first seat belt; and
      a first take-up time of the first seat belt;
   a second seat belt being disposed on the vehicle between a second plurality of mounting points including:
      second lumbar region mounting points disposed at either side of the second seat; and
      a right shoulder mounting point disposed at a right side of the second seat;
   a second adjuster being coupled to the second seat belt and defining a second occupant restraining condition, the second occupant restraining condition including at least one of:
      a second take-up tension of the second seat belt; and
      a second take-up time of the second seat belt; and
   a controller outputting first and second control signals to the first and second adjusters, respectively, to redefine the first and second occupant restraining conditions relative to one another in response to the vehicle making a turn, and
   wherein the first adjuster varies the first take-up tension and the second adjuster varies the second take-up tension within an operating time, and the controller controls the first and second adjusters so that the operating time when the direction of the turn corresponds to the one of the occupant's right and left shoulders being restrained by the three-point seat belt is set shorter than when the direction of the turn is opposite to the one of the occupant's right and left shoulders being restrained by the three-point seat belt.

11. The occupant restraining system described in claim 10, wherein the first take-up tension is less than the second take-up tension in response to a turn in a right direction, and the second take-up tension is less than the first take-up tension in response to a turn in a left direction.

12. The occupant restraining system described in claim 10, wherein the first take-up time is greater than the second take-up time in response to a turn in a right direction, and the second take-up time is greater than the first take-up time in response to a turn in a left direction.

13. The occupant restraining system described in claim 10, wherein the first adjuster in response to the first control signal reduces the first take-up tension and increases the first take-up time in response to the vehicle making a turn in a right direction, and the second adjuster in response to the second control signal reduces the second take-up tension and increases the second take-up time in response to the vehicle making a turn in a left direction.

14. A vehicle seat belt tensioner for a three-point seat belt installed in a vehicle and used to restrain both sides of an occupant's lumbar region as well as one of the occupant's right and left shoulders, the vehicle seat belt tensioner comprising:
   tension means for adjusting tension of the three-point seat belt;
   turning means for detecting a turn made by the vehicle; and
   control means for controlling the tension means in response to the turning means detecting that the vehicle has made the turn such that the tension of the three-point seat belt when a direction of the turn is opposite to the one of the occupant's right and left shoulders being restrained by the three-point seat belt is set lower than when the direction of the turn corresponds to the one of the occupant's right and left shoulders being restrained by the three-point seat belt,
   wherein the tension means is arranged to vary the tension within an operating time, and the control means controls is arranged to control the tension means so that the operating time when the direction of the turn corresponds to the one of the occupant's right and left shoulders being restrained by the three-point seat belt is set shorter than when the direction of the turn is opposite to the one of the occupant's right and left shoulders being restrained by the three-point seat belt.

15. A method of controlling tension of a three-point seat belt that is installed in a vehicle and that restrains both sides of an occupant's lumbar region as well as one of the occupant's right and left shoulders, the method comprising:
   detecting the vehicle is making a turn in one of a right direction and a left direction;
   controlling the tension of the three-point seat belt in response to the detecting such that the tension of the three-point seat belt when the turn in the one of the right and left directions is opposite to the one of the occupant's right and left shoulders being restrained by the three-point seat belt is set lower than when the turn in the one of the right and left directions corresponds to the one of the occupant's right and left shoulders being restrained by the three-point seat belt;
   varying the tension within an operating time; and
   controlling the tension so that the operating time when the direction of the turn corresponds to the shoulder being restrained by the seat belt is shorter than when the direction of the turn is opposite to the shoulder being restrained by the seat belt.

16. The method described in claim 15, wherein the detecting comprises sensing a steering angle of the vehicle and sensing a velocity of the vehicle.

17. The method described in claim 15, wherein the controlling comprises setting the tension of the three-point seat belt higher when the vehicle is traveling straight than when the turn in the one of the right and left directions is opposite to the one of the occupant's right and left shoulders being restrained by the three-point seat belt.

18. The method described in claim 15, wherein the controlling comprises setting the tension of the three-point seat belt higher when the turn in the one of the right and left directions corresponds to the one of the occupant's right and left shoulders being restrained by the three-point seat belt than when the vehicle is traveling straight.

* * * * *